B. A. MORRISON & J. H. DUIS.
AUTOMOBILE LIGHT CIRCUIT CONTROLLER.
APPLICATION FILED JAN. 4, 1917.

1,248,375.

Patented Nov. 27, 1917.
2 SHEETS—SHEET 1.

Witnesses
J. R. Tomlin
R. L. Parker

B. A. Morrison and
J. H. Duis Inventors
by C. A. Snow & Co.
Attorneys

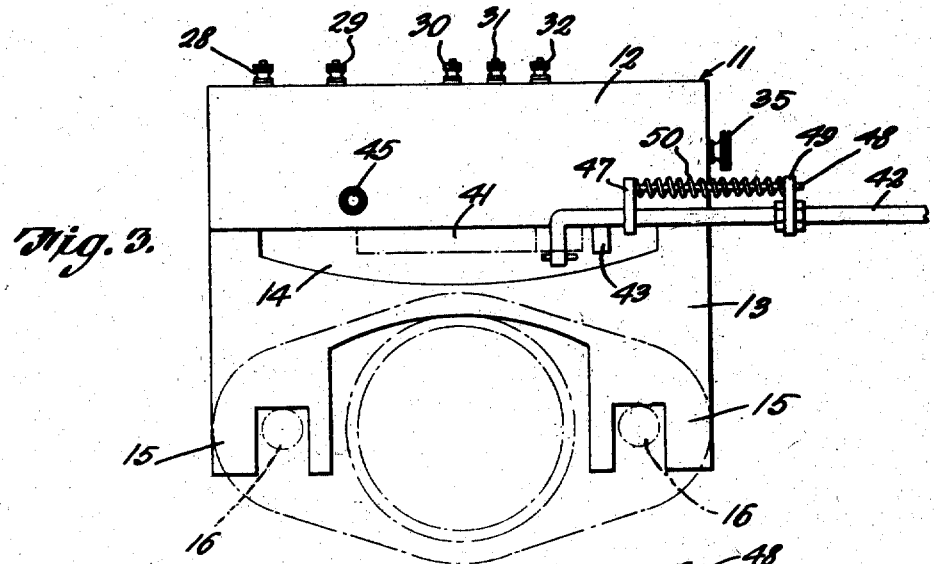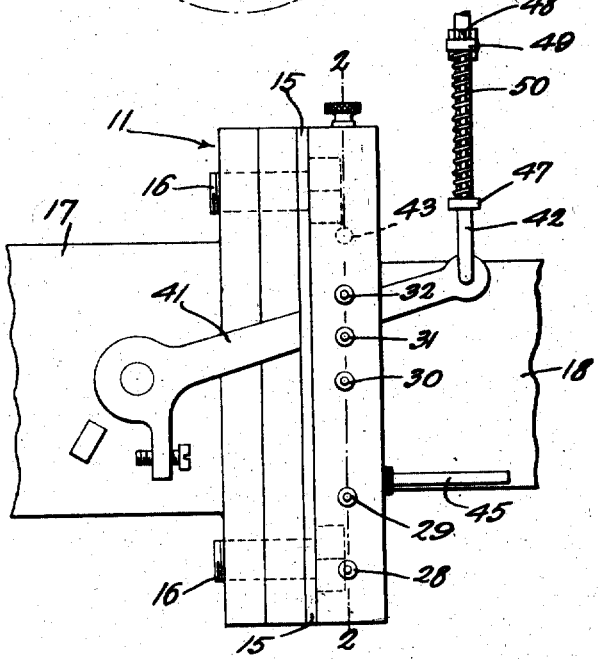

UNITED STATES PATENT OFFICE.

BERTIE A. MORRISON AND JOHANNES H. DUIS, OF FLANAGAN, ILLINOIS.

AUTOMOBILE-LIGHT-CIRCUIT CONTROLLER.

1,248,375.  Specification of Letters Patent.  Patented Nov. 27, 1917.

Application filed January 4, 1917.  Serial No. 140,622.

*To all whom it may concern:*

Be it known that we, BERTIE A. MORRISON and JOHANNES H. DUIS, citizens of the United States, residing at Flanagan, in the county of Livingston, State of Illinois, have invented a new and useful Automobile-Light-Circuit Controller, of which the following is a specification.

The present invention appertains to a controller adapted for use upon Ford and other automobiles, and operable for controlling the electric lights, it being the object of the invention to provide a novel and improved appliance of that nature for bringing both of the head-lights into the circuit when the machine is operating above a predetermined speed, and to cut out one of the head-lights when the speed of the machine is decreased, in order that the single head-light will be supplied with sufficient electrical energy to maintain its brilliancy.

Another object of the invention is to provide a device of the nature indicated operable for disconnecting the tail light from the magneto or generator when the automobile is left standing or its engine stopped, and for connecting the tail light in circuit with a battery to keep the tail light energized.

A further object of the invention is the provision of a novel and improved controller applicable to the carbureter and intake manifold to be operated by the throttle controlling means for accomplishing the results above pointed out.

The invention also has for its object the provision of a controller of the nature indicated which is comparatively simple and inexpensive in construction, which can be readily applied, and which will be thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Fig. 3 is an elevation of the controller.

Fig. 4 is a plan view thereof.

Figure 1:
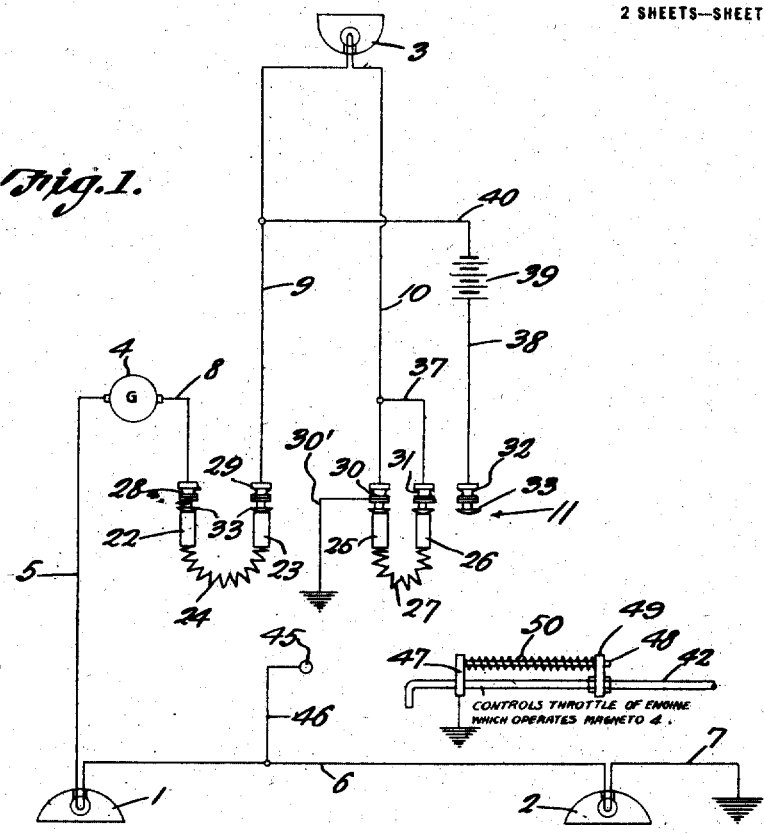
Figure 1 is a diagrammatical view of the lighting system including the controller.

Before describing in detail the construction of the controller, reference is had to Fig. 1 which illustrates the lighting system of a Ford or similarly equipped automobile. This figure illustrates the two head lights or lamps 1 and 2, the tail light or lamp 3, and magneto or generator 4 which has one terminal connected by a conductor 5 with one terminal of the lamp 1. The other terminal of said lamp is connected with one terminal of the lamp 2 by a conductor 6, and the other terminal of the lamp 2 is grounded to the frame of the automobile, as at 7. A conductor 8 is connected to the other terminal of the generator 4, and is connected by means of the present controller with a conductor 9 connected to one terminal of the lamp 3, the other terminal having a conductor 10 connected thereto which is grounded to the frame as will hereinafter more fully appear.

Figure 2:
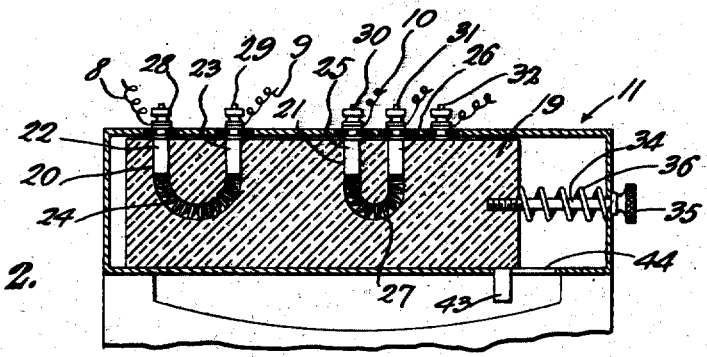
Fig. 2 is a vertical section of the controller taken on the line 2—2 of Fig. 4, portions being shown in elevation and portions being broken away.

In carrying out the invention, there is provided a controller 11 for the lighting circuits, said controller embodying a horizontally elongated casing 12 of suitable material in which a switch member or block 19 is mounted for sliding movement, the member 19 being preferably of suitable insulating material. The member 19 is provided with two U-shaped cavities or passages 20 and 21, and contact pins 22 and 23 are slidable in the terminals of the cavity 20 and a coiled wire expansion spring 24 is disposed within the intermediate portion of said cavity and its terminals bear against the pins 22 and 23 tending to project said pins from the cavity. Similarly, contact pins 25 and 26 are slidable within the terminals of the cavity 21 and are projected under the influence of a coiled wire expansion spring 27 disposed within the intermediate portion of the cavity 21. The casing 12 carries a series of insulated binding posts 28, 29, 30, 31 and 32 having the rounded contacts 33 upon the interior of the casing to be engaged by the contact pins. A stem 34 is attached to one end of the switch member 19 and projects slidably through the respective end of the casing, being provided at its outer end with a knob 35, and a coiled wire expansion spring 35 surrounds the stem 34 and is confined between the member 19 and end of the casing for normally moving the member 19 to the position illustrated in Fig. 2 with the pins 22 and 23 engaging the contacts of the binding posts 28 and 29, respectively, and with the contact pins 25 and 26 engaging the contacts of the respective binding posts 30 and 31. When the member 19 is slid against the tension of the spring 36, to the right as seen in Fig. 2, the contact pins are removed from said contacts, and the contact pins 25 and 26 are adapted to move into engagement with the contacts of the respective binding posts 31 and 32.

The binding post 30 is grounded to the frame, as at 30', the binding post 31 is connected by a branch conductor 37 with the conductor 10, and the binding post 32 is connected by a conductor 38 with one pole of the battery 39 which has its other pole connected by a conductor 40 with the conductor 9.

The casing 12 is supported by a bracket 13 having the slot or opening 14 adjacent to the casing, and having the slotted or notched ears 15 engageable with the bolts 16 which clamp the carbureter 17 to the intake manifold 18, so that the throttle lever 41 of the carbureter can project through the slot 14 to work therein in throttling the engine, by means of the rod 42 connected to said lever. The member 19 has a depending lug 43 working in a slot 44 in the casing and projecting into the slot 14. The lug 43 is so arranged that when the lever 41 is swung to its extreme position for completely opening the throttle valve, the lever 41 engages the lug 43 and slides the member 19 against the tension of the spring 36 to the right, as seen in Fig. 2. This movement of the member 19 is used for disconnecting the tail light from the generator and connecting it to the battery 39.

In order to shunt out the lamp 2 when the throttle valve is moved toward closed position for retarding the speed of the engine, which ordinarily decreases the current supplied by the generator or magneto 4 to such an extent, that the head lights are dimmed, an outstanding insulated contact pin 45 is carried by the casing 12 in the path of movement of the contact 47 slidable upon the operating rod 42 of the throttle arm or lever 41. The contact 47 has a stem 48 slidable through an adjustable member 49 upon the rod 42, and a coiled wire expansion spring 50 surrounds the stem 48 and is confined between the contact 47 and member 49 to yieldably project the contact 47. The contact 47 and contact pin 45 are so arranged that when the throttle lever 41 is swung to partially close the throttle valve for decreasing the speed of the engine below a certain amount, said contact and contact pin engage one another. The contact pin 45 is connected by a conductor 46 with the conductor 6 between the lamps 1 and 2, and the contact 47 is grounded to the frame of the machine. Thus when the rod 42 is moved a predetermined amount for closing the throttle valve, the contact 47 will strike the contact pin 45, and will be stopped thereby, but the rod 42 can be moved farther for further closing the throttle valve.

In operation, the throttle lever 41 in its ordinary movements does not strike the lug 43 or move the switch member 19, so that the following lighting circuit is closed: The generator 4, conductor 5, lamp 1, conductor 6, lamp 2, conductor 7, ground, conductor 30', binding post 30, conductor 10, lamp 3, conductor 9, binding post 29, pin 23, spring 24, pin 22, binding post 28 and conductor 8. The head and tail lights are therefore connected in series with the generator or magneto and the tail light will assist in protecting the head lights. It is assumed that the contact 47 is removed from the contact pin 45 when current also flows through the lamp 2 as above described, and in this position of the contact 47, the throttle valve is open sufficiently to operate the engine at high speed, or at a speed above a predetermined amount, in which event, the generator 4 is operated at a sufficient speed to supply electrical energy for lighting all of the lamps. When the throttle valve is closed a certain amount, the contact 47 is brought against the contact pin 45, which will shunt or cut out the lamp 2, so that the decreased electrical energy created by the generator will be sufficient to maintain the brilliancy of the lamp 1, thereby giving sufficient light for illuminating the road ahead. When the contact 47 engages the contact pin 45, the current instead of flowing by ground between the conductors 7 and 30', will flow from the conductor 6 along conductor 46, pin 45, contact 47, and ground to the conductor 30', following the path of least resistance, and thereby lighting lamps 1 and 3 only, while the lamp 2 is extinguished. When the speed is increased, the contact 47 being removed from the contact pin 45 again brings the lamp 2 into the circuit, the electrical energy created by the generator 4 now being sufficient to also light the lamp 2.

When the automobile is at a standstill or the engine stopped, so that the tail light would no longer be supplied with electrical energy, said tail light can be maintained energized by moving the throttle lever 41 to extreme open position when it will contact with the lug 43 and move said lug and switch member 19. The contact pins 22, 23, 25 and 26 are therefore removed from the contacts of the binding posts 28, 29, 30 and 31, respectively, and the contact pins 25 and 26 are brought into engagement with the contacts of the respective binding posts 31 and 32, whereby the binding posts 31 and 32 are electrically connected by means of the pins 25 and 26 and the spring 27. The following battery circuit is therefore closed: Battery 39, conductor 40, part of conductor 9, lamp 3, conductor 10, branch conductor 37, binding post 31, pin 25 which now engages contact of binding post 31, spring 27, pin 26, binding post 32 which is now engaged by pin 26, and conductor 38. The lamp 3 is therefore energized to comply with the law. When the engine is started, the throttle lever 41 being moved away from extreme open position, will release the lug 43 so that the spring 36 will move the switch member 19 back to normal position, thereby again bringing the generator or magneto into the circuit as before.

Having thus described the invention, what is claimed as new is:

1. The combination with throttle controlling means, a magneto, a tail light lamp, another lamp, and a circuit including all of said lamps and magneto, of a battery, and means operated by the throttle controlling means and operable when the throttle controlling means is moved to one position for opening said circuit and connecting the tail light lamp only with the battery.

2. The combination with throttle controlling means, a tail light lamp, head light lamps, a magneto, and a circuit including all of said lamps and magneto, of a battery, means operated by the throttle controlling means for shunting one of the head light lamps when the throttle controlling means is moved in one direction, and means operated by the throttle controlling means when it is moved in the other direction for connecting the tail light lamp only with the battery.

In testimony that we claim the foregoing as our own, we have hereto affixed our signatures.

BERTIE A. MORRISON.
JOHANNES H. DUIS.

Copies of this patent may be obtained for five cents each, by addressing the "Commissioner of Patents, Washington, D. C."